J. E. KELLER, Jr.
INFLATION VALVE.
APPLICATION FILED JAN. 7, 1909.
966,023.
Patented Aug. 2, 1910.
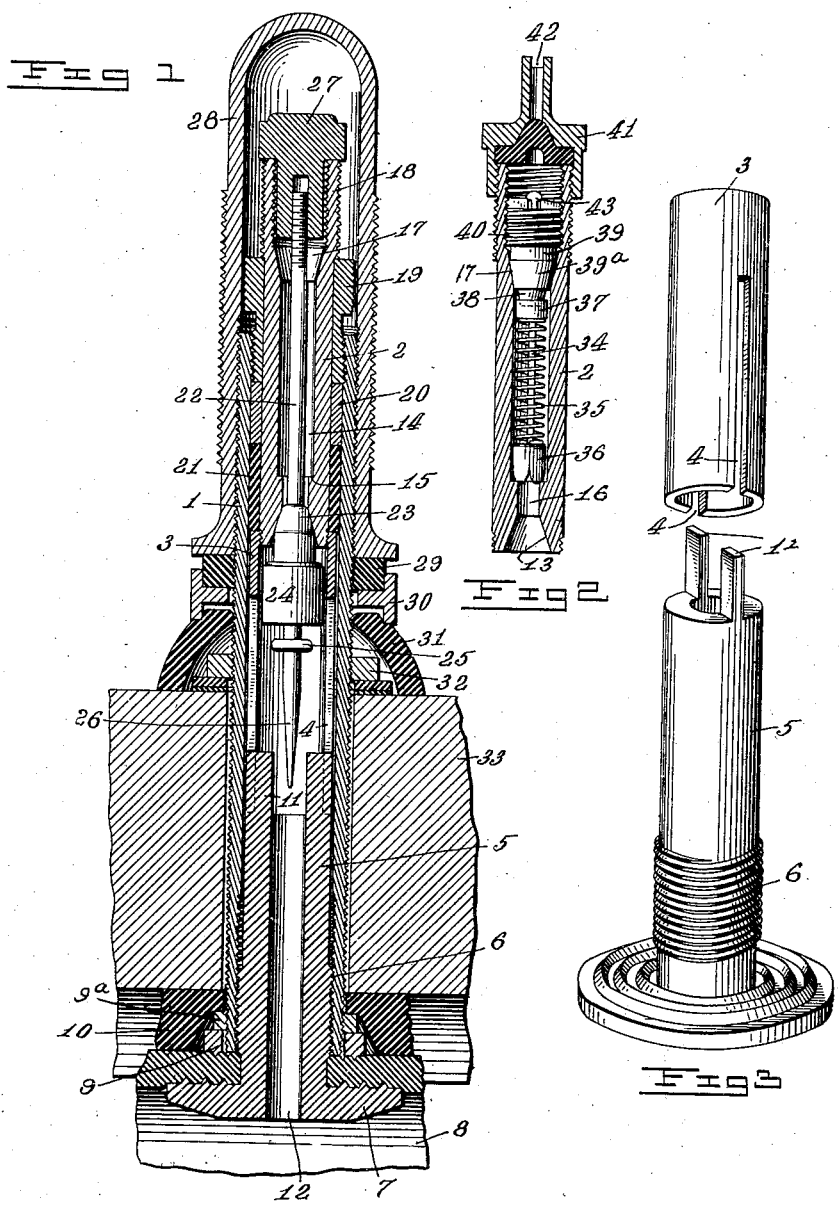

UNITED STATES PATENT OFFICE.

JOHN E. KELLER, JR., OF LITCHFIELD, CONNECTICUT.

INFLATION-VALVE.

966,023.  Specification of Letters Patent.  Patented Aug. 2, 1910.

Application filed January 7, 1909.  Serial No. 471,184.

*To all whom it may concern:*

Be it known that I, JOHN E. KELLER, Jr., a citizen of the United States, residing at Litchfield, in the county of Litchfield and State of Connecticut, have invented new and useful Improvements in Inflation-Valves, of which the following is a specification.

My invention relates to inflation valves such as are adapted for use in connection with pneumatic tires and the like, and more particularly to improvements upon the valve shown and described in my prior application Serial No. 386,546, filed August 1, 1907.

One object of the invention is to provide a valve tube so designed that a plurality of different types of valve may be interchangeably used in connection therewith.

A further object of the invention is to simplify and strengthen the construction, and to provide means for positively locking the valve tube and tire tube together, so as to eliminate any possibility of their becoming accidentally separated.

A still further object of the invention is to so construct the various parts that they may be readily put together and taken apart.

With the above and other objects in view, and to improve generally upon the details of such devices, my invention consists in the construction and arrangement of parts hereinafter described, and illustrated in the accompanying drawing, in which—

Figure 1 is a central longitudinal section through my improved valve complete, showing also the means of attachment to the tire and wheel felly. Fig. 2 is a similar view showing the valve tube detached and illustrating its adaptation to a different form of valve. Fig. 3 is a perspective view of the locking plug and the lower end of the valve tube which coöperates therewith.

Referring to the drawing in detail, the valve comprises an outer tube 1, in which fits the valve tube. As illustrated, the valve tube comprises an upper section 2, containing the valve seat, and a lower section or extension 3, secured to the upper section as by means of screw threads. The lower part of the section 3 is provided with longitudinally extending slots 4, hereinafter referred to.

Secured in the lower end of the outer tube is a locking plug 5, provided at its lower end with a corrugated head 7. The preferred method of securing the locking plug in the outer tube is by means of screw threads 6, which after the parts are assembled, may, if desired, be brazed. A washer 9 slips loosely over the outer tube, and a lock nut 9ª, fitting the screw threads thereon, presses the washer toward the head 7 in such manner as to clamp between them the wall of the inner tube 8, of the tire.

10 designates the outer tire tube, which lies next to the wheel felly, and through which passes the outer tube 1.

The plug 5 is provided at its upper end with a pair of upwardly projecting arms 11, which arms are of such dimensions as to loosely enter the slots 4, formed in the section 3, of the valve tube. Relative rotation between the valve tube and outer tube 1 is thus prevented, while at the same time free longitudinal movement is permitted. The locking plug is provided with a centrally extending bore or passage 12 through which air flows into the tire.

By reference to Figs. 1 and 2, it will be seen that the upper section of the valve tube 2 comprises a cylindrical barrel, having at its lower end a conical or concaved valve seat 13. Above this seat, and extending through the middle portion of the tube, is a hollow bore 14 terminating just above the seat in an annular shoulder 15. A passage 16 connects the valve seat 13 with the bore or chamber 14. At its upper end the chamber 14 is formed with a conical enlargement 17, and beyond this extends an externally and internally screw-threaded portion 18.

A compression nut 19, having a knurled head, surrounds the upper section of the tube and is provided with external screw threads which engage interior threads formed in the upper end of the outer tube 1. Below the compression nut 19 is preferably disposed a metallic sleeve or collar 20, and below this inturn is an expansible sleeve 21, preferably formed of india rubber or the like. It will be observed that the sleeve 21 abuts at its lower end an annular shoulder formed by the upper end of the lower section 3, of the valve tube, and therefore when the nut 19 is screwed down into the tire tube, pressure is exerted on the sleeve 21 in such manner as to cause it to expand and engage the inner walls of the outer tube 1. It will thus be seen that the screw-threaded engagement of the nut 19 with the outer tube 1 forms a positive securing means for locking the valve tube and outer tube together, and at the same time the expansible sleeve 21 forms a very efficient packing so as to insure an absolutely air tight joint between the two tubes. This is essential in order to prevent leakage.

A valve stem 22 extends through the valve tube, and carries a valve which is adapted to coöperate with the seat 13. This valve preferably comprises the usual cup 24, in which is secured rubber or other soft packing 23, which engages the valve seat. The end 26 of the valve stem extends down between the projecting arms 11 of the locking plug, and just below the cup 24 the valve stem is formed with an annular enlargement or collar 25. The function of this enlargement is to prevent the bottom of the cup 24 of the valve from coming in contact with the arms 11, and thus obstructing the air passage 12 when air is being pumped into the tire. The valve is normally held to its seat by the air pressure within the tire, and to avoid any possibility of its becoming displaced, the usual cap 27 is screw-threaded onto the upper end of the valve stem.

In order to protect the parts from dust and moisture, a cap 28 is screwed over the outer tube 1, and preferably seats at its lower end against a packing ring 29, carried in a metallic ring 30, which, in turn, rests upon a rubber bushing 31, all as described in my above-mentioned application. If desired, however, the parts 29 and 30 may be omitted, and the cap 28 rest directly against the bushing 31. A locking nut 32 serves to secure the tire tube to the felly 33.

In Fig. 2 I have illustrated the adaptability of my improved valve tube for use in connection with a valve of entirely different type. This is a highly important feature, since it results in the production of a device in which different makes of valves may be used interchangeably, and this feature is readily appreciated by those experienced with this character of apparatus. Referring to this figure, I have shown a valve stem 34, loosely connected at one end to a cup 36 which rests against the shoulder 15, and carrying at its other end a valve seat 37. A coil spring 35 surrounds the stem 34, and serves to maintain the valve seat 37 in contact with the nipple 38, which constitutes the valve. This nipple is carried by a plug 39, having suitable packing 39ª, coöperating with the seat 17, and provided at its upper end with a screw-threaded portion 40, adapted to engage the screw threads formed on the inside of the valve tube. In order to prevent any possibility of leaking, a cap 41, having the usual packing, is screw-threaded to the top of the tube. This cap, at its upper end, is provided with a notch 42 which may be used as a wrench to engage the pintle 43 carried by the plug 40, in order to screw and unscrew the same.

It will thus be seen that I have provided a valve tube in which different makes of valves may be used interchangeably, and which is at the same time simple, cheap and compact, and it is therefore thought that the numerous advantages of my invention will be readily appreciated by those experienced in such matters.

What I claim is,—

1. In combination, an outer tube, a valve tube fitting therein, and a locking plug secured in said outer tube and detachably connected with said valve tube, whereby the parts are held against rotation, said plug projecting from said outer tube, and having at its end a head adapted to engage the tire.

2. In combination, an outer tube, a valve tube fitting therein, a locking plug secured in the end of said outer tube and having means to engage the valve tube, said plug comprising a head and a shank portion, the shank portion having threads engaging in said outer tube, and a nut screw-threaded onto such outer tube and coöperating with the head to clamp the tire between said parts.

3. In combination, an outer tube, a valve tube within the same and spaced therefrom, an expansible sleeve surrounding said valve tube and bearing against a shoulder thereon, and a nut also surrounding said valve tube and screw threaded into the outer tube, and serving to exert a pressure on said sleeve and expand the same, and cause it to engage the said outer tube.

4. In combination, an outer tube, a valve tube within the same and spaced therefrom, an expansible sleeve surrounding said valve tube and bearing against a shoulder thereon, and in contact with said outer tube, a compression sleeve bearing upon said expansible sleeve, and a nut surrounding said valve tube and screw-threaded into said outer tube, and bearing against said compression sleeve.

5. In combination, an outer tube, a valve tube within the same and spaced therefrom, said valve tube comprising an upper and a lower section secured together, the upper edge of the lower section forming an annular shoulder, an expansible sleeve surrounding said upper section, and a compression nut surrounding said valve tube and serving to compress said sleeve between itself and said shoulder, whereby said sleeve is expanded into contact with said outer tube.

6. In combination, an outer tube, a valve tube within the same and spaced therefrom, a locking plug projecting into said outer tube from below, said locking plug having upwardly projecting arms adapted to detachably engage said valve tube, a valve stem extending through said valve tube and downwardly between said projecting arms, a valve secured to said stem, and an annular enlargement formed on said stem adjacent said valve, such enlargement adapted to engage said projecting arms and prevent contact of said valve therewith.

7. In combination, an outer tube, a valve tube within the same and spaced therefrom, a locking plug in said outer tube having projecting arms adapted to freely fit slots in said valve tube, a valve stem extending through said valve tube and between said arms, a valve secured to said stem, and means carried by said stem for preventing contact of said valve with said arms.

8. In combination, an outer tube, and a valve tube fitting therein, said valve tube having near one end a chamber adapted to receive one type of valve, and near its other end a chamber adapted to receive another type of valve, whereby either type of valve may be used interchangeably but alone in said tube.

9. In combination, an outer tube, and a valve tube fitting therein, said valve tube having a valve seat near one end adapted to coöperate with one form of valve, and having near its other end a chamber into which another form of valve, with its seat, may be fitted, whereby either form of valve may be used in said tube as desired.

In testimony whereof I have hereunto set my hand in presence of two subscribing witnesses.

JOHN E. KELLER, Jr.

Witnesses:
K. L. BUEL,
J. L. MOWER.